United States Patent
Wu et al.

(10) Patent No.: US 10,613,307 B2
(45) Date of Patent: Apr. 7, 2020

(54) INTEGRATED ROTARY STRUCTURE AND FABRICATION METHOD THEREOF

(71) Applicant: Semiconductor Manufacturing International (Shanghai) Corporation, Shanghai (CN)

(72) Inventors: Qiang Wu, Shanghai (CN); Liwan Yue, Shanghai (CN)

(73) Assignee: Semiconductor Manufacturing International (Shanghai) Corporation, Shanghai (CN)

(*) Notice: Subject to any disclaimer, the term of this patent is extended or adjusted under 35 U.S.C. 154(b) by 64 days.

(21) Appl. No.: 15/896,361

(22) Filed: Feb. 14, 2018

(65) Prior Publication Data

US 2018/0172967 A1    Jun. 21, 2018

Related U.S. Application Data

(62) Division of application No. 15/192,006, filed on Jun. 24, 2016, now Pat. No. 9,927,601.

(30) Foreign Application Priority Data

Jun. 26, 2015    (CN) .......................... 2015 1 0363583

(51) Int. Cl.
*G02B 19/00*    (2006.01)
*H05G 2/00*    (2006.01)

(52) U.S. Cl.
CPC ..... *G02B 19/0095* (2013.01); *G02B 19/0019* (2013.01); *H05G 2/005* (2013.01); *H05G 2/006* (2013.01); *H05G 2/008* (2013.01)

(58) Field of Classification Search
USPC ..................................................... 250/504 R
See application file for complete search history.

(56) References Cited

U.S. PATENT DOCUMENTS

| | | |
|---|---|---|
| 9,480,136 B2 | 10/2016 | Teramoto et al. |
| 2004/0223200 A1* | 11/2004 | Waldman ................. G03H 1/02 359/15 |
| 2016/0116332 A1 | 4/2016 | Wu et al. |

FOREIGN PATENT DOCUMENTS

CN            105573062 A        5/2016

* cited by examiner

*Primary Examiner* — Kiet T Nguyen
(74) *Attorney, Agent, or Firm* — Anova Law Group, PLLC

(57) ABSTRACT

Integrated rotary structure and fabrication method thereof are provided. An integrated rotary structure includes a cylinder material. The cylinder material includes a circular side wall, a third surface at one end of the circular side wall and a fourth surface at another end of the circular side wall opposing to the third surface. The third surface of the cylinder material is machined to form an elliptical reflective surface. The circular side wall of the cylinder material is machined to form a fifth surface and a sixth surface. A central symmetrical axis of the fifth surface and the sixth surface coincides with a first optical axis of the elliptical reflective surface. By using the fifth surface and the sixth surface as holding planes, the third surface is machined to form a curved non-reflective surface surrounding the elliptical reflective surface.

9 Claims, 10 Drawing Sheets

INTEGRATED ROTARY STRUCTURE AND FABRICATION METHOD THEREOF

CROSS-REFERENCES TO RELATED APPLICATIONS

This application is a divisional of U.S. patent application Ser. No. 15/192,006, filed on Jun. 24, 2016, which claims the priority of Chinese patent application No. 201510363583.9, filed on Jun. 26, 2015, the entire content of all of which is incorporated herein by reference.

TECHNICAL FIELD

The disclosed subject matter generally relates to semiconductor technology and, more particularly, relates to integrated rotary structure and fabrication method thereof.

BACKGROUND

Photolithography, an important step in a manufacturing process for a semiconductor device, can be used to form a resist pattern in a resist layer by using an exposure process and a development process. Along with the continuous improvement of chip integration, a feature size of photolithography continues to decrease.

A minimum feature size of photolithography is determined by the resolution (R) of an exposure apparatus. The resolution (R) of an exposure system satisfies the following formula: $R=k\lambda/(NA)$, where k is a coefficient relating to the exposure process, $\lambda$ represents a wavelength of the exposure light source, NA is the numerical aperture of the optical system of the exposure apparatus. According to the formula, the resolution of the exposure apparatus can be increased by increasing the numerical aperture of the optical system or by reducing the wavelength of the exposure light source.

For increasing the numerical aperture of the optical system to improve the resolution, due to a rigor demanding of the minimum feature size of the next-generation photolithography technology, a very large optical numerical aperture is required. However, the increasing of the numerical aperture not only complicates the preparation and modulation of the photolithography system, but also restricts the depth of focus of the optical system.

For reducing the wavelength of the exposure light source for improving the resolution, the extreme ultraviolet (EUV) light source is the latest developed light source. An EUV light source can generate an exposure light with a 13.5 nm wavelength. So the usage of an EUV light source in an exposure system can obtain a small feature size of photolithography.

An existing method to produce extreme ultraviolet (EUV) light includes use of laser produced plasma (LPP) radiation mode. A laser beam generated by a laser source may bombard a tin (Sn) target for exciting plasma. The excited plasma can radiate extreme ultraviolet (EUV) light.

A structure of an existing EUV light source can be referred to FIG. 1. The EUV light source includes a tin droplet nozzle 101, a laser source 103, lens unit 105, and a condenser lens 107. The tin droplet nozzle 101 can downwardly eject tin droplets 102. The laser light source 103 can generate a laser beam 104. The laser beam 104 can be convergent after going through lens unit 105. The convergent laser beam can bombard tin droplets 102 to generate plasma. The plasma can radiate extreme ultraviolet light 108. The condenser 107 can collect extreme ultraviolet light 108 and gather the extreme ultraviolet light 108 at the central focus 109.

However, the power of the existing EUV light source is still too low to meet the production requirements.

Accordingly, it desirable to provide an extreme ultraviolet (EUV) light source, an exposure apparatus, and a method for fabricating an integrated rotary structure to at least partially alleviate one or more problems set forth above and to solve other problems in the art.

BRIEF SUMMARY

One aspect of the disclosed subject matter provides an extreme ultraviolet light source, comprising: a droplet nozzle array droplet nozzle array comprising a plurality of nozzles arranged in a ring, wherein the plurality of nozzles are configured for sequentially ejecting droplets towards an annular radiation position; a laser source for generating a laser beam, wherein the laser beam is controlled to rotate and sequentially bombard the droplets that reach the annular radiation position, wherein the bombarded droplets form a plasma that radiates an extreme ultraviolet light; and an integrated rotary structure located between the droplet nozzle array and the laser source, wherein the integrated rotary structure includes: a condenser mirror comprising a first surface and a second surface opposing to the first surface, and a motor driving shaft that is integrally connected with the condenser mirror, wherein the first surface faces the droplet nozzle array, the second surface is connected with the motor driving shaft, the first surface comprises an eccentric and inclined elliptical reflective surface and a non-reflective surface surrounding the elliptical reflective surface, and the elliptical reflective surface is configured for collecting and reflecting the extreme ultraviolet light, and converging the extreme ultraviolet light at a central focus under the annular radiation position.

In some embodiments, the integrated rotary structure further comprises a thrust bearing integrally connected with the motor driving shaft.

In some embodiments, the plurality of nozzles are equidistantly arranged in the ring; and each nozzle is inclined at a first angle toward a center of the ring.

In some embodiments, the annular radiation position has a ring shape; the annular radiation position is parallel to the ring of the plurality of nozzles; and a radius of the annular radiation position is smaller than a radius of the ring of the plurality of nozzles.

In some embodiments, a connection between a center of the annular radiation position and a center of the ring of the plurality of nozzles is perpendicular with the annular radiation position.

In some embodiments, the central focus is located on an extension line of the connection between a center of the annular radiation position and a center of the ring of the plurality of nozzles.

In some embodiments, the connection between the center of the annular radiation position and the center of the ring of the plurality of nozzles coincides with a first optical axis of the elliptical reflective surface.

In some embodiments, the extreme ultraviolet light source further comprises a brushless motor configured for driving the integrated rotary structure to rotate with respect of the first optical axis.

In some embodiments, the elliptical reflective surface has a second optical axis going through the central focus; and an inclined angle of the elliptical reflective surface is equal to an angle between the first optical axis and the second optical axis.

In some embodiments, the extreme ultraviolet light source further comprises: a first through hole in the center of the elliptical reflective surface; a second through hole in the motor driving shaft; and a third through hole in the thrust bearing; wherein the first through hole, the second through hole, and the third through hole are interconnected with each other to form a laser beam incident channel; and wherein the laser source comprises: a laser device configured for generating the laser beam; a focusing lens located in the first through hole and fixed with the condenser mirror, wherein the focusing lens is configured for focusing the laser beam to the annular radiation position.

In some embodiments, the laser source further comprises a reflecting device for reflecting the laser beam generated by the laser device into the laser beam incident channel.

In some embodiments, the extreme ultraviolet light source further comprises: a control unit configured for synchronously outputting a first signal and a second signal, wherein: the first signal controls the plurality of nozzles to sequentially eject droplets, and the second signal controls the brushless motor to drive the integrated rotary structure to make the elliptical reflective surface and the focusing lens rotate synchronously.

In some embodiments, the laser device is a pulses pump laser device.

In some embodiments, the first signal controls the plurality of nozzles to sequentially eject droplets in a certain direction, wherein each nozzle ejects a droplet after a first lag period of an instance that an adjacent nozzle ejects a droplet.

In some embodiments, the first lag period equals a time interval between two adjacent laser pulses generated from the pulses pump laser device.

In some embodiments, the first signal controls each nozzle to continuously eject droplets; a time interval between two adjacent ejecting is a second lag period; and the second lag period equals to a number of the plurality of nozzles times the first lag period.

Another aspect of the disclosed subject matter provides an exposure apparatus, comprising: an extreme ultraviolet light source, comprising: a droplet nozzle array comprising a plurality of nozzles arranged in a ring, wherein the plurality of nozzles are configured for sequentially ejecting droplets towards an annular radiation position; a laser source for generating a laser beam, wherein the laser beam is controlled to rotate and sequentially bombard the droplets that reach the annular radiation position, wherein the bombarded droplets form a plasma that radiates an extreme ultraviolet light; and an integrated rotary structure located between the droplet nozzle array and the laser source, wherein the integrated rotary structure comprises: a condenser mirror comprising a first surface and a second surface opposing to the first surface, and a motor driving shaft that is integrally connected with the condenser mirror, wherein the first surface faces the droplet nozzle array, the second surface is connected with the motor driving shaft, the first surface comprises an eccentric and inclined elliptical reflective surface and a non-reflective surface surrounding the elliptical reflective surface, and the elliptical reflective surface is configured for collecting and reflecting the extreme ultraviolet light, and converging the extreme ultraviolet light at a central focus under the annular radiation position.

Another aspect of the disclosed subject matter provides a method for fabricating an integrated rotary structure, comprising: providing a cylinder material, comprising a circular side wall, a third surface at one end of the circular side wall and a fourth surface at another end of the circular side wall opposing to the third surface; machining the third surface of the cylinder material to form an elliptical reflective surface, wherein: a second optical axis of the elliptical reflective surface coincides with an axis of the cylinder material passing through centers of the third and fourth surfaces, and the ellipsoidal reflective surface sinks into the cylinder material and by a first depth; forming a first through hole going through a center of the elliptical reflective surface; machining the circular side wall of the cylinder material to form a fifth surface and a sixth surface, wherein: both the fifth surface and the sixth surface have a first angle with the second optical axis, and a central symmetrical axis of the fifth surface and the sixth surface coincides with a first optical axis of the elliptical reflective surface; and using the fifth surface and the sixth surface as holding planes, machining the third surface to form a curved non-reflective surface surrounding the elliptical reflective surface.

In some embodiments, forming the curved non-reflective surface comprises: forming a first cambered surface that is in contact with or close to a high point of the elliptical spherical reflective surface; and forming a second cambered surface that is in contact with or close to a low point of the elliptical spherical reflective surface.

In some embodiments, the method further comprises: removing a portion of the cylinder material along the fifth surface and the sixth surface to form a curved second surface, wherein the second surface opposites a first surface comprising the non-reflective surface and the elliptical reflective surface; machining a remaining portion of the cylinder material along the fifth surface and the sixth surface to form a motor driving shaft connecting with the second surface; and machining a remaining portion of the cylinder material along the fourth surface, the fifth surface, and the sixth surface to form a thrust bearing connecting with the motor driving shaft.

Other aspects of the disclosed subject matter can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
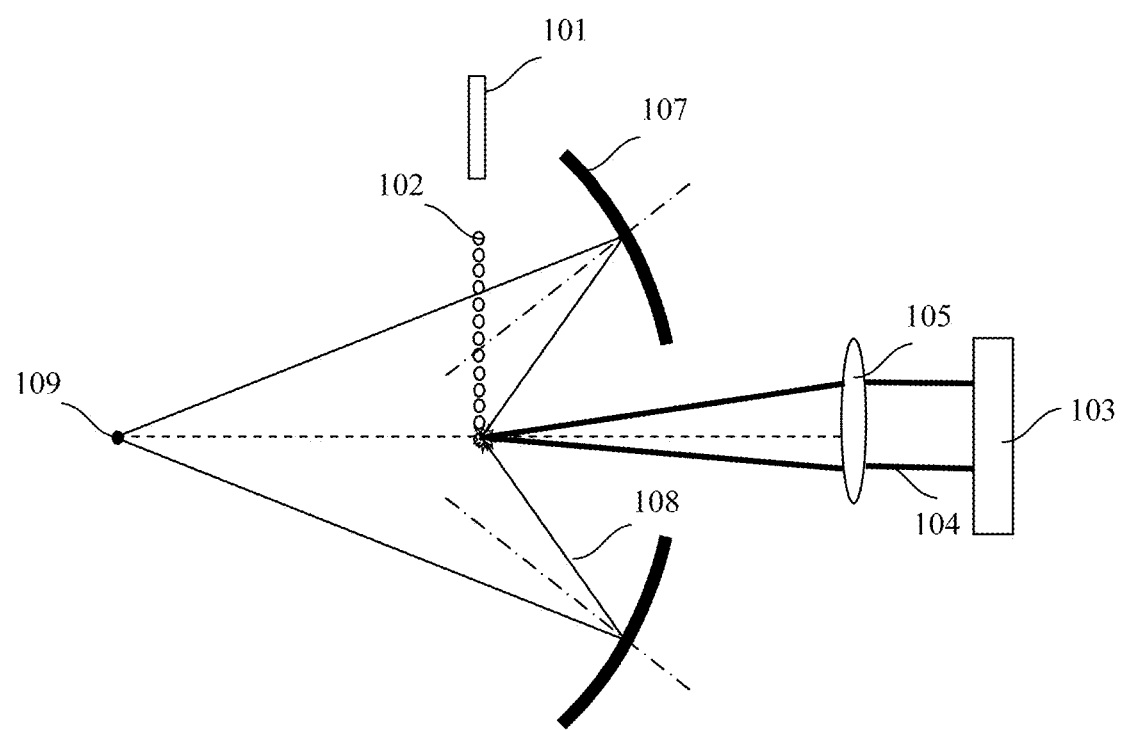
FIG. 1 is a schematic structural diagram of an existing EUV light source.

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of one disclosure. In an actual production, a disclosed subject matter may include three spatial dimensions of length, width and depth.

It is apparent that the described embodiments are some but not all of the embodiments of the present invention. Based on the disclosed embodiments, persons of ordinary skill in the art may derive other embodiments consistent with the present disclosure, all of which are within the scope of the present invention.

The power of existing extreme ultraviolet (EUV) light sources for generating EUV is around 10 W to 30 W. But in an actual photolithography process, a required power of a light source can reach 250 W. So, the existing EUV light sources cannot generate EUV light that meets the actual production requirements.

In existing EUV light sources, a tin droplet nozzle mechanically controls the ejection of tin droplets to make neighboring tin droplets be spatially separated. A laser beam can bombard each tin droplet to form tin plasma. The tin plasma can produce extreme ultraviolet (EUV) radiation. If two neighboring tin droplets has a too small distance, or two tin droplets stick together, when the laser beam bombard a current tin droplet, the generated tin plasma debris can affect the following tin droplet, resulting in many problems, such as poor laser beam bombardment, difficulty in collecting extreme ultraviolet radiation, and other issues. All these problems can reduce the power of the EUV light source.

In order to ensure integrity of each tin droplet and a certain distance between adjacent tin droplets, an ejecting frequency limit of the existing mechanically controlled tin droplet nozzle is about 100 KHz. Since the number of ejecting tin droplets per unit time of the existing tin droplets nozzle is limited, the number of tin droplets per unit time that are bombarded by the laser beam is limited. Thus an amount of plasma generated by bombarding the tin droplets and an amount of extreme ultraviolet light radiated from the plasma are also limited. Thus an amount of extreme ultraviolet light convergence on the central focus per unit time is limited. Therefore, the power of the existing EUV light source is small.

Accordingly, the disclosed subject matter provides an extreme ultraviolet lithography (EUV) light source, an exposure apparatus, and a method for fabricating an integrated rotary structure, which are directed to solve the problem set forth above or other problems in the art.

In accordance with some embodiments, an extreme ultraviolet light source can be provided.

The extreme ultraviolet light source can include a droplet nozzle array comprising a plurality of nozzles arranged in a ring. The plurality of nozzles are configured for sequentially ejecting droplets downwardly to an annular radiation position.

The extreme ultraviolet light source can further include a laser source for generating a laser beam. The laser beam is controlled to rotate and sequentially bombard the droplets that reach the annular radiation position.

The extreme ultraviolet light source can further include an integrated rotary structure located in between of the droplet nozzle array and the laser source. The integrated rotary structure can include a condenser mirror comprising a first surface and a second surface opposing to the first surface, and a motor driving shaft that is integrally connected with the condenser mirror. The first surface faces the droplet nozzle array. The second surface is connected with the motor driving shaft. The first surface comprises an eccentric and inclined elliptical reflective surface and a non-reflective surface surrounding the elliptical reflective surface. The elliptical reflective surface is configured for collecting and reflecting extreme ultraviolet light radiated from bombarded droplets, and converging the extreme ultraviolet light at a central focus under the annular radiation position.

The disclosed extreme ultraviolet light source can increase the supply of droplets per unit time, and maintain a certain distance between adjacent droplets. The laser beam can rotate and sequentially bombard the droplets to form extreme ultraviolet light. Since no droplet that reaches the annular radiation position is wasted, the amount of generated extreme ultraviolet light may be increased. Also, the elliptical reflective surface of the rotating condenser mirror can collect and reflect the extreme ultraviolet light, and converge the extreme ultraviolet light at the central focus. Therefore, a power of the extreme ultraviolet light at the central focus can be increased.

Referring to FIGS. 2-9, schematic structural diagrams of exemplary EUV light sources are shown in accordance with some embodiments of the disclosed subject matter.

Figure 2:
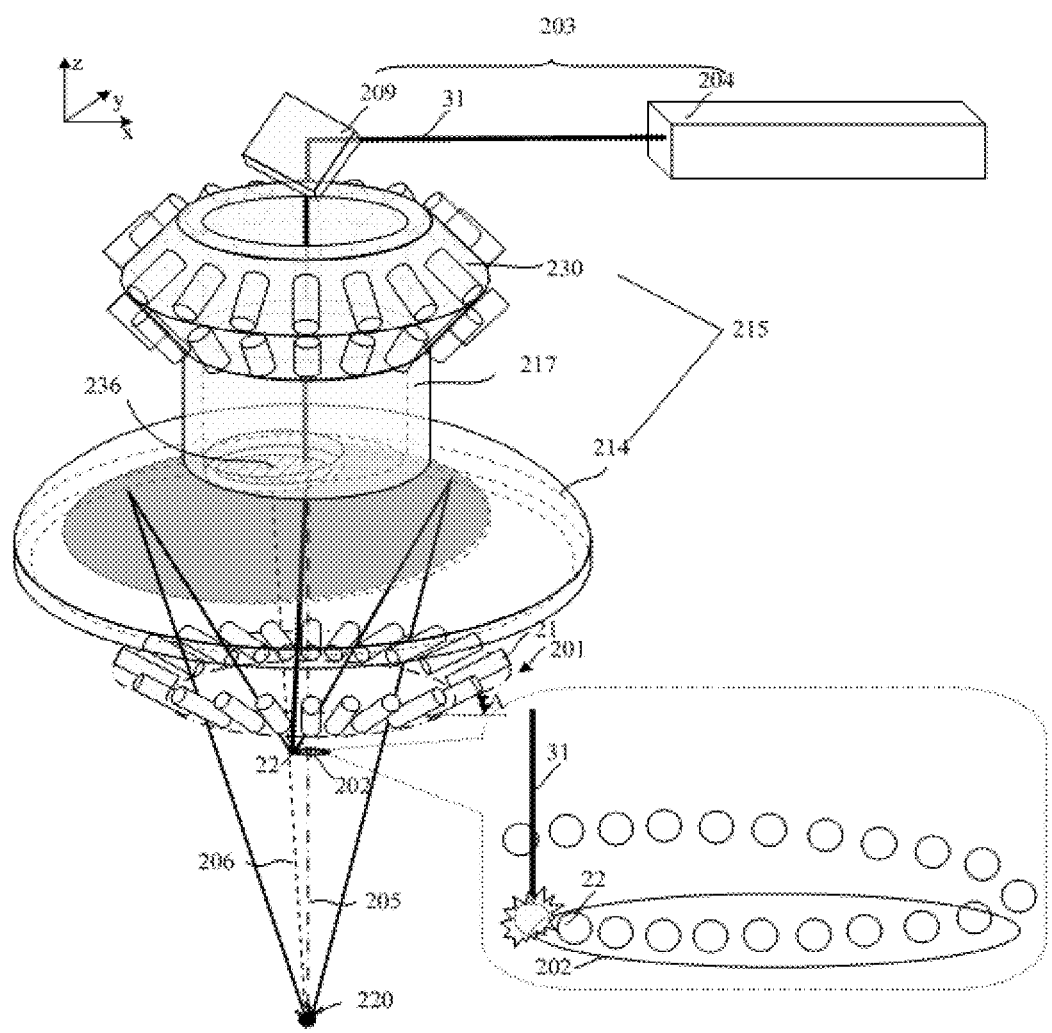
FIGS. 2-9 are schematic structural diagrams of exemplary EUV light sources in accordance with some embodiments of the disclosed subject matter.
Figure 3:
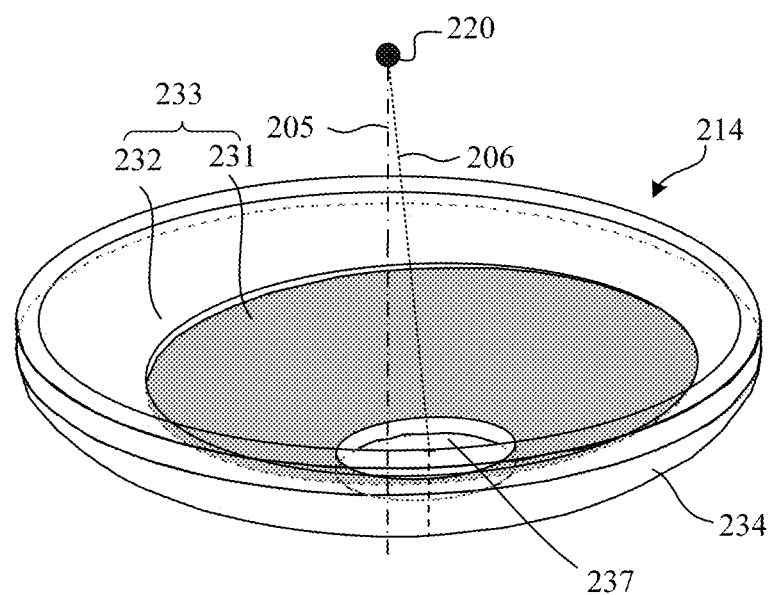

A structure of an EUV light source is illustrated in FIG. 2, and a structure of a condenser lens of the EUV light source is illustrated in FIG. 3.

The EUV light source can include droplet nozzle array 201, laser source 203, and integrated rotary structure 215.

In some embodiments, the droplet nozzle array 201 includes multiple nozzles 21 that are arranged along a circular ring. The multiple nozzles 21 can successively eject droplets downwardly towards the annular radiation position 202.

In some embodiments, the laser source 203 can generate a laser beam 31 that is incident from above into the droplet nozzle array 201. The laser beam 31 can rotate and scan, and successively bombard the droplets that reach the annular radiation position 202. A plasma radiating EUV light can be formed by bombarding the droplets.

The integrated rotary structure 215 is located between the droplet nozzle array 201 and the laser source 203. In some embodiments, the integrated rotary structure 215 includes a condenser mirror 214, and a motor driving shaft 217 that is integrally connected with the condenser mirror 214.

The condenser mirror 214 includes a first concave surface 233 and a second concave surface 234 opposing to the first concave surface 233. The first concave surface 233 faces to the droplet nozzle array 201. The second surface 234 is connected with the motor driving shaft 217. In some embodiments, the first concave surface 233 includes an elliptical reflective surface 231 that is eccentric and inclined, and a non-reflective surface 232 surrounding the elliptical reflective surface 231.

When the integrated rotary structure 215 is rotating, the elliptical reflective surface 231 can converge the radiating extreme ultraviolet light on a central focus 220 under the annular radiation position 202.

In some embodiments, the EUV light source further includes a droplet supply chamber (not shown in the figure) for storing the droplet material for forming the droplets. The droplet supply chamber can be connected with the multiple nozzles 21 through intermediate pipes (not shown in the figures). The droplet material stored in the droplet supply chamber can form multiple droplets and be ejected by the multiple nozzles 21.

In some embodiments, the droplet nozzle array 201 further includes multiple switches corresponding to the multiple nozzles 21 separately. Each switch can control a correspond nozzle 21 for ejecting droplets. In some embodiments, the switches may be placed on the intermediate pipes between the nozzles 21 and the droplet supply chamber. The flows of the droplet material in the intermediate pipes can be controlled by the switches, so that each nozzle 21 can intermittently eject droplets 22 towards the annular radiation position 202. The multiple switches can be mechanical switches controlled by electrical signals to open and close the intermediate pipes to realize intermittently ejecting droplets 22.

In some embodiments, the multiple nozzles 21 are arranged in an annular region. The spaces between adjacent nozzles in the annular region are equal. Each nozzle 21 is inclined at a first angle A toward the center of the annular region. In some embodiments, the first angle A has a range between 20 and 40 degrees. Each nozzle 21 has a same caliber. The lower edges of the multiple nozzles 21 are in a plane that is parallel to the plane of the annular radiation position 202. Thus every droplet ejected from the multiple nozzles 21 can travel a same distance to the annular radiation position 202. In some embodiments, the plane of the lower edges of the multiple nozzles 21 is parallel to the X-Y axis plane.

In some embodiments, the droplet material can be tin, tin alloy, tin compound, lithium, or xenon. The tin compound may be $SnBr_4$, $SnBr_2$, $SnH_4$, etc. The tin alloy may be gallium-tin alloy, gallium, indium-tin alloy, tin-indium-gallium alloy, etc.

Depending on the different selected droplet material, the temperature of the droplets 22 on the annular radiation position 202 can also be different.

The annular radiation position 202 is an annular region located below the droplet nozzle array 201. The plane of the annular radiation position 202 is parallel to the plane of the lower edges of the multiple nozzles 21. In some embodiments, the plane of the annular radiation position 202 is parallel to the X-Y axis plane. In some embodiments, a radius of the annular region of the annular radiation position 202 is less than a radius of the annular region of the multiple nozzles 21. The center of the annular region of the annular radiation position 202 is below the center of the annular region of the multiple nozzles 21.

In some embodiments, the EUV light source further includes a first optical axis 205. The first optical axis 205 goes through the center of the annular region of the annular radiation position 202, the center of the annular region of the multiple nozzles 21, and the axis of the integrated rotary structure 215. The central focus 220 is located below the annular radiation position 202, and on the connection extension line of the center of the annular region of the annular radiation position 202 and the center of the annular region of the multiple nozzles 21.

Referring to FIG. 3, an enlarged schematic structural diagram of an exemplary condenser lens is shown in accordance with some embodiments of the disclosed subject matter.

The condenser mirror 214 can have a bowl-shape. The condenser mirror 214 includes a first concave surface 233 and a second concave surface 234 opposing to the first concave surface 233. The first concave surface 233 faces to the droplet nozzle array 201. The second surface 234 is connected with the motor driving shaft 217. In some embodiments, the first concave surface 233 includes an elliptical reflective surface 231 that is eccentric and inclined, and a non-reflective surface 232 surrounding the elliptical reflective surface 231.

The elliptical reflective surface 231 can collect the radiating extreme ultraviolet light formed by bombarding the droplets 22 on the annular radiation position 202, and converge the radiating extreme ultraviolet light on the central focus 220 under the annular radiation position 202. The collection and convergence of the extreme ultraviolet light follows the law of reflection. The non-reflective surface 232 does not reflect the extreme ultraviolet light, or even some extreme ultraviolet portion reflected by the non-reflective surface 232 does not converge on the central focus 220.

The first optical axis 205 goes through the center of the condenser mirror 214, and coincides with the axis of the condenser mirror 214. The elliptical reflective surface 231 has a second optical axis 206 that goes through the center of the elliptical reflecting surface 231 and coincides with the axis of the elliptical reflecting surface 231.

The elliptical reflecting surface 231 is eccentric and inclined. The center of the elliptical reflecting surface 231 has a distance from the center of the condenser mirror 214. An inclination angle of the elliptical reflecting surface 231 equals to an angle between the first optical axis 205 and the second optical axis.

Since the elliptical reflecting surface 231 is eccentric and inclined, when the condenser mirror 214 is rotating, the elliptical reflecting surface 231 can successively collect the extreme ultraviolet light radiated by the bombarded droplets that are sequentially reach the annular radiation position 202, and can converge the extreme ultraviolet light on the central focus 220.

In some embodiments, the annular radiation position 202 corresponds to a first focus of the elliptical reflective surface 231, while the central focus 220 corresponds to a second focus of the elliptical reflective surface 231. When the condenser mirror 214 is rotating, the first focus of the elliptical reflective surface 231 is moving along with the annular radiation position 202, while the second focus of the elliptical reflective surface 231 is fixed at the position of the central focus 220. Therefore, when the condenser mirror 214 is rotating, the generated extreme ultraviolet light at the first focus (or annular radiation position 202) can be collected and reflected by the elliptical reflective surface 231. The reflected extreme ultraviolet light can converge on the second focus (or the central focus 220).

In some embodiments, besides the elliptical reflective surface 231, the condenser mirror 214 further includes a non-reflective surface 232 surrounding the elliptical reflective surface 231. The non-reflective surface 232 can balance the mass of the condenser mirror 214 to make a mass distribution of the condenser mirror 214 being centrosymmetric to the first optical axis 205. Thus when the condenser mirror 214 is high-speedily rotating around the first optical axis 205, the integrated rotary structure can maintain a good dynamic balance to prevent an offset or twisted from the condenser mirror 214.

In some embodiments, the condenser mirror 214 can further include a first through hole 237. The first through hole 237 can penetrate a first surface 233 and a second surface 234 of the condenser mirror 214. The first surface 233 includes the elliptical reflective surface 231 and the non-reflective surface 232.

Figure 4:
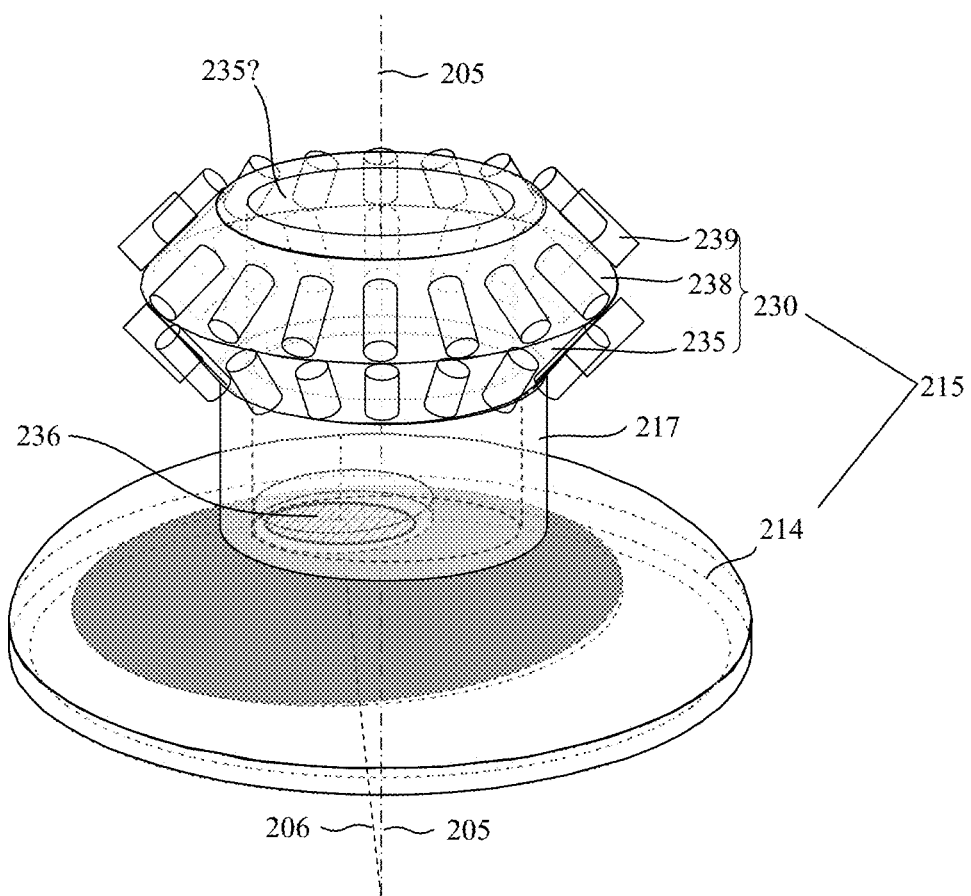
Figure 5:
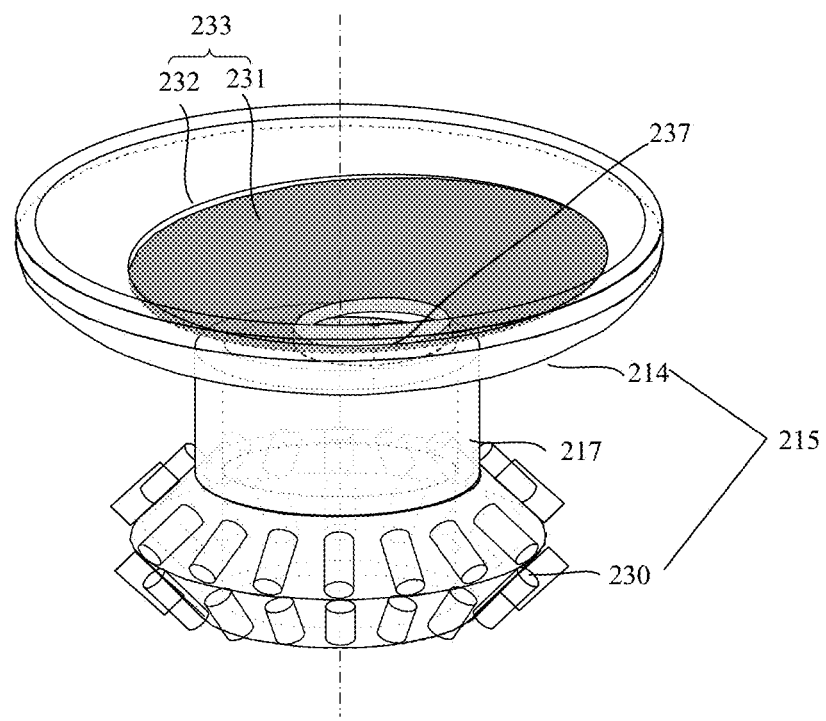

Referring to FIGS. 4 and 5, schematic structural diagrams of the integrated rotary structure are shown in accordance with some embodiments of the disclosed subject matter.

The center of the first through hole 237 coincides with the center of the elliptical reflective surface 231. The first through hole 237 is used as channel for the incident laser beam, and is also used to place the focusing lens 236. The focusing lens 236 is used for converging the incident laser beam 31 to focus on the annular radiation position 202, which can be in accordance with FIG. 2 described above.

The focusing lens 236 is located in the first through hole 237. The focusing lens 236 can be fixedly connected to the side wall of the first through hole 237. The axis of the focusing lens 236 is parallel to the first optical axis 205. An extension line of the axis of the focusing lens 236 goes through the annular radiation position 202, which can be in accordance with FIG. 2 described above.

In some embodiments, the integrated rotary structure 215 further includes a motor driving shaft 217. A center axis of the motor driving shaft 217 coincides with the first optical axis 205. The motor driving shaft 217 is integrally connected with the second surface 234 of the condenser mirror 214. For example, the motor driving shaft 217 and the condenser mirror 214 can be integrally fabricated by a single subject. The motor driving shaft 217 and the condenser mirror 214 can be made by a same material. Thereby a mechanical strength of the integral rotary structure 215 can be increased.

The motor driving shaft 217 is a rotor shaft of a brushless motor. The brushless motor can further include stator coils (not shown in the figures) surrounding the motor driving shaft 217, and a mounting bracket of stator coil (not shown in the figures) disposed outward of the stator coils. Driven by the brushless motor, the motor driving shaft 217 can rotate around the first axis 205. Since the motor driving shaft 217 is integrally connected to the condenser mirror 214, when the motor driving shaft 217 is rotating, the corresponding condenser mirror 214 and the focusing lens 236 are also rotating around the first optical axis 205. During the rotating process, a laser beam focused by the focusing lens 236 can sequentially bombard the droplets 22 that reach the annular radiation position 202. The radiated extreme ultraviolet light can be collected and reflected by the elliptical reflective surface 231 of the condenser mirror 214, and be convergent on the central focus 220.

The motor driving shaft 217 has a second through hole connecting to the first through hole 237 in the condenser mirror 214. An inner diameter of the second through hole is larger than an inner diameter of the first through hole 237. An axis of the second through hole coincides with the first optical axis 205.

The integrated rotary structure 215 also includes a thrust bearing 230 that is integrally connected with the motor driving shaft 217. The axis of the thrust bearing 230 coincides with the first optical axis 205. A third through hole is in the thrust bearing 230. The third through is connected to the second through hole in the motor driving shaft 217. An inner diameter of the third through hole is equal to the inner diameter of the second through hole. An axis of the third through hole coincides with the first optical axis 205. Both the second through hole and the third through hole are configured as a laser beam incident channel.

The thrust bearing 230 is connected to a mounting bracket (not shown in the figures) to make the integrated rotary structure 215 hanging in the air, and enabling to rotate when driven by the brushless motor.

Figure 6:
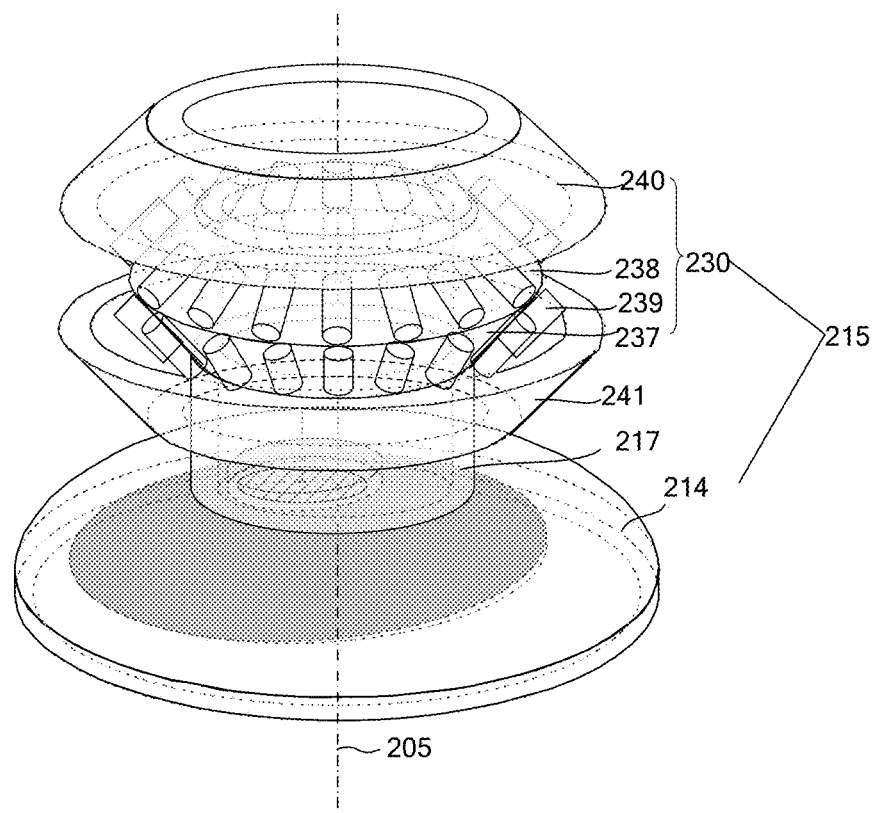
Figure 7:
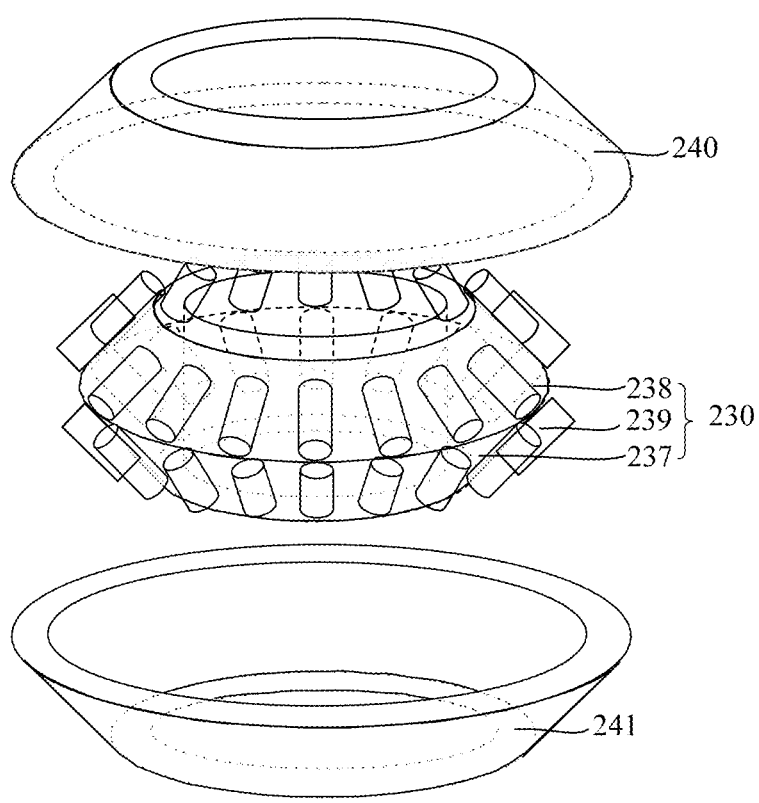

Referring to FIG. 4, FIG. 6 and FIG. 7, the thrust bearing 230 includes inner rings 235 and 238, outer rings 240 and 241, and multiple rolling elements 239 located between the inner rings 237, 238 and outer rings 240, 241.

The inner rings 235 and 238 are connected integrally with the motor driving shaft 217. The third through hold is inside of the inner rings 235 and 238. The inner rings include a first inner ring 235 and a second inner ring 238 that is integrally connected with the first inner ring 235. The first inner ring 235 and the second inner ring 238 are protruded from the outer surface of the motor driving shaft 217. The outer surfaces of the first inner ring 235 and the second inner ring 238 are inclined to the first axis 205. An angle between the outer surface of the first inner ring 235 and the outer surface of the second inner ring 238 is less than 90 degrees. In one embodiment, a cross-sectional view of the outer surface of the first inner ring 235 and the outer surface of the second inner ring 238 is "< >" shape.

The multiple rolling elements 239 may be cylindrical or spherical balls. The multiple rolling elements 239 can include multiple first rolling elements locating on the outer surface of the first inner ring 235, and multiple second rolling elements locating on the outer surface of the second inner ring 238.

The outer rings configuring for confining the multiple rolling elements 239 are connected to the mounting bracket. The outer rings include a first outer ring 241 for confining the multiple first rolling elements, and a second outer ring 240 for confining the multiple second rolling elements. Thus the multiple first rolling elements can roll between the outer surface of first inner ring 235 and the inner surface of first outer ring 241, and the multiple second rolling elements can roll between the outer surface of second inner ring 238 and the inner surface of second outer ring 240.

In some embodiments, the inner rings of the thrust bearing 230 and the motor driving shaft 217 are integrally connected with each other to enhance the mechanical strength of integral rotary structure 215. The inner rings of the thrust bearing 230 include two inclined outer surfaces intersecting with each other. Multiple first rolling elements and second rolling elements are respectively provided to contact to the two inclined outer surfaces. And two outer rings are provided for confining the first rolling elements and second rolling elements. Thus, the thrust bearing 230 has very mall swings in both vertical and horizontal directions due to being evenly forced. Additionally, the condenser mirror 214 has very mall swings in both vertical and horizontal directions during rotating. Therefore, an intensity uniformity of the extreme ultraviolet light at the central focus 220 can be improved.

In some other embodiments, the thrust bearing 230 and the motor driving shaft 217 may be separate parts, and can be fixedly connected with each other by welding or other suitable method. For example, the inner rings of the thrust bearing 230 can be welded to the outer surface of one end of the motor driving shaft 217.

Figure 8:
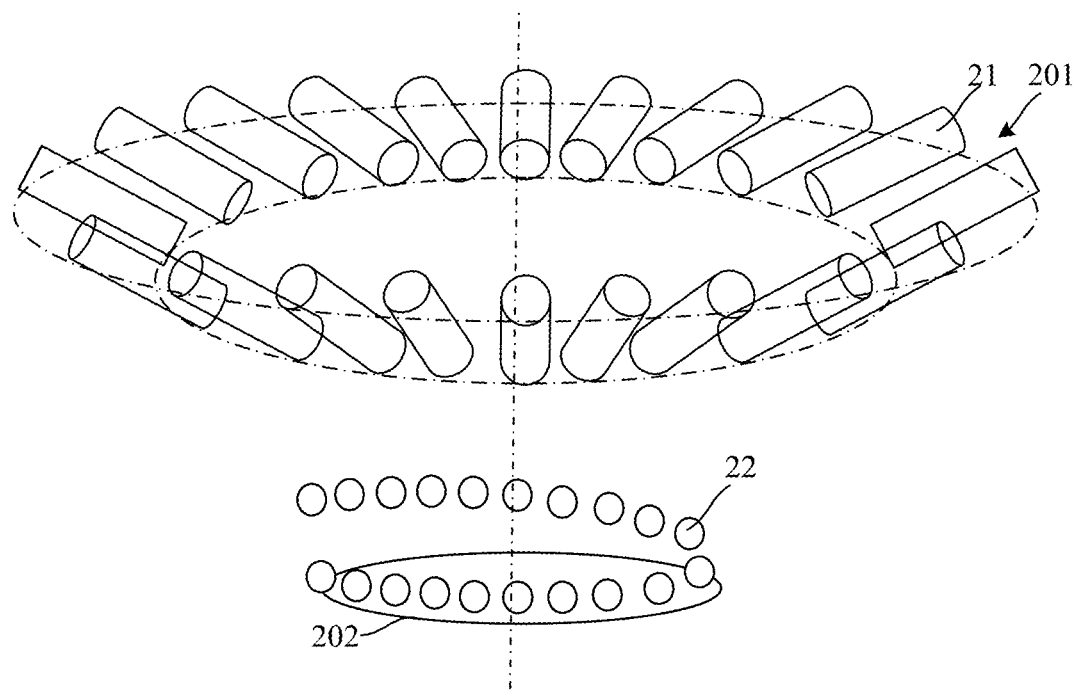
Figure 9:
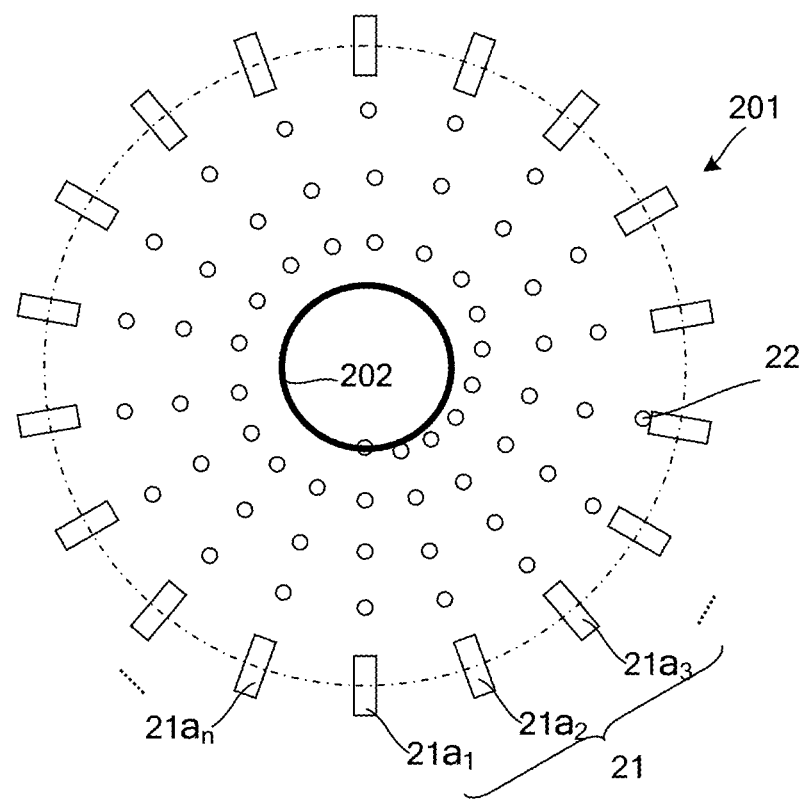

Referring to FIGS. 8 and 9, enlarged schematic structural diagrams of the droplet nozzle array 201 are shown in accordance with some embodiments of the disclosed subject matter. FIG. 8 is a perspective view of the droplet nozzle array 201 and FIG. 9 is a top view of the droplet nozzle array 201.

As illustrated, the droplet nozzle array 201 includes multiple nozzles 21 that are annularly arranged. The multiple nozzles 21 successively include first nozzle 21a1, second nozzle 21a2, third nozzle 21a3, . . . , and the Nth (N≥3) nozzle 21an.

In the droplet nozzle array 201, a distance between two adjacent nozzles 21 can be a fixed value. The multiple nozzles 21 can regularly eject droplets 22 in an annular sequence to the annular radiation position 202. A distance between two adjacent droplets in the annular sequence is also a fixed value. Thus droplet nozzle array 201 can sequentially eject droplets to the annular radiation position 202. A rotational scanning laser beam can successively bombard the droplets one by one that reaches the annular radiation position 202. A droplet to be bombarded does not be effected by the plasma debris formed by bombarding the antecedent droplet. It should be noted that, the distance between two adjacent nozzles 21 is an arc length of the annular ring of the lower edges of the nozzles 21.

In one particular embodiment, a distance between two adjacent droplets at the annular radiation position 202 is around 45 microns to 75 microns. A size of droplets 22 ejected from the nozzles 21 is around 25 microns to 35 microns.

The multiple nozzles 21 can eject multiple droplets 22 downwardly to the annular radiation position 202 by the following process. The first nozzle 21a1 ejects a first droplet at a first instance, the second nozzle 21a2 ejects a second droplet at a second instance, the third nozzle 21a3 ejects a third droplet at a third instance, . . . , the Nth nozzle 21an eject an Nth droplet at an Nth instance. The time intervals between all adjacent time instances are equal to a same value, such as a lag period.

Thus, the multiple droplets can successively reach the annular radiation position 202 one by one in a sequence. For example, the first droplet ejected from the first nozzle 21a1 firstly reaches the annular radiation position 202. After a lag period, the second droplet ejected from the second nozzle 21a2 reaches the annular radiation position 202. After another lag period, the droplet ejected from the third nozzle 21a3 reaches the annular radiation position 202 . . . . After a lag period when the (N−1)th droplet reaches the annular radiation position 202, the Nth droplet ejected from the Nth nozzle 21an reaches the annular radiation position 202.

In conjunction with reference to FIG. 2 and FIG. 8, when the multiple nozzles 21 are sequentially ejecting droplet 22 downwardly to the annular radiation position 202, the integral rotary structure 215 is rotating. A laser beam generated by the laser source 203 going through the focusing lens 236 is also rotating. The rotating laser beam can sequentially bombard the multiple droplets 22 one by one that reaches the annular radiation position 202.

A specific bombardment process can be the following. The laser beam generated by the laser source 203 bombards the first droplet that reaches the annular radiation position 202. The laser beam rotates along the annular radiation position 202 with the rotating focusing lens 236. When the second droplet reaches the annular radiation position 202, the laser beam bombards the second droplet that reaches the annular radiation position 202. The laser beam continuously rotates along the annular radiation position 202 with the rotating focusing lens 236. When the third droplet reaches the annular radiation position 202, the laser beam bombards the third droplet that reaches the annular radiation position 202 . . . . The laser beam continuously rotates along the annular radiation position 202 with the rotating focusing lens 236. When the Nth droplet reaches the annular radiation position 202, the laser beam bombards the Nth droplet that reaches the annular radiation position 202.

When the rotating laser beam sequentially bombards the multiple droplets 22 one by one that reaches the annular radiation position 202, the multiple bombarded droplets 22 can sequentially generate plasma. The generated plasma can radiate extreme ultraviolet (EUV) light. In the same time, the condenser mirror 214 is also rotating. The elliptical reflective surface 231 (refer to FIG. 3) of the condenser mirror 214 can sequentially collect and reflect the extreme ultraviolet light radiated from the multiple bombarded droplets and converge the extreme ultraviolet light on the central focus 220.

A specific collecting and reflecting process can be the following. The elliptical reflective surface 231 collects and reflects the extreme ultraviolet light radiated from the bombarded first droplet and converges the extreme ultraviolet light on the central focus 220. The elliptical reflective surface 231 rotates with the integral rotary structure 215. Then the elliptical reflective surface 231 collects and reflects the extreme ultraviolet light radiated from the bombarded second droplet and converges the extreme ultraviolet light on the central focus 220. The elliptical reflective surface 231 continuously rotates with the integral rotary structure 215. The elliptical reflective surface 231 collects and reflects the extreme ultraviolet light radiated from the bombarded third droplet and converges the extreme ultraviolet light on the central focus 220 . . . . The elliptical reflective surface 231 continuously rotates with the integral rotary structure 215. The elliptical reflective surface 231 collects and reflects the extreme ultraviolet light radiated from the bombarded Nth droplet and converges the extreme ultraviolet light on the central focus 220.

Referring back to FIG. 8 and FIG. 9, the multiple nozzles 21 in the droplet nozzle array 201 can repeatedly eject multiple droplets 22 downwardly to the annular radiation position 202 by the following process. In a first circulation, the first nozzle 21a1 ejects a first droplet at a first instance, the second nozzle 21a2 ejects a second droplet at a second instance, the third nozzle 21a3 ejects a third droplet at a third instance, . . . , the Nth (N≥3) nozzle 21an eject an Nth droplet at an Nth instance. The time intervals between all adjacent time instances are equal to a same value, such as a first lag period. And then in a second circulation, the multiple nozzles 21 can repeat the above process. In some embodiments, the number of circulations can be a predetermined number M (M≥4).

Therefore, considering only one nozzle, the nozzle 21 can eject one droplet every one fixed time interval, such as a second lag period. In one embodiments, a value of the second lag period is equal to a value of the first lag period times a total number of the multiple nozzles 21. For example, the first nozzle 21 ejects one first droplet, after a second lag period the first nozzle 21 ejects another first droplet, after another second lag period the first nozzle 21 ejects a third first droplet, . . . , after another second lag period the first nozzle 21 ejects an Mth (M≥4) first droplet.

The disclosed droplet nozzle array 201 can regularly and constantly eject droplets downwardly to the annular radiation position 202. A droplets supply amount per unit time can be increased by using the ejecting process described above. Additionally, the laser beam generated from the laser source 203 can also regularly spin, and sequentially bombard the droplets at the annular radiation position 202. Furthermore, the elliptical reflective surface 231 of the condenser mirror 214 can regularly rotate, collect and reflect the radiated extreme ultraviolet light, and converge the extreme ultraviolet light at the central focus 220. Consequently, a power of the extreme ultraviolet light at the central focus 220 is improved.

Referring back to FIG. 2, in some embodiments, the laser source 203 includes a laser device 204 and a fixed mirror 209 deposited at a 45 degree angle. The laser device 204 is located above one side of the integral rotary structure 215. The fixed mirror 209 can reflect the laser beam 31 emitted from the laser device 204 into the laser beam incident channel consisting of the second through hole and the third through hole. The laser beam 31 can go through the laser beam incident channel and reach the surface of the focusing lens 236. The fixed mirror 209 is disposed on the extension line of the first optical axis 205.

In some other embodiments, the mirror may not be provided. The laser device 204 can be directly provided on the extension line of the first optical axis 205. The laser beam generated by the laser device 204 can directly go along a direction coincident with the first optical axis 205 through the second through hole and third through hole, and reach the surface of the focusing lens 236.

In some embodiments, the relative positions of the focusing lens 236 and the condenser mirror 214 are fixed. The central axis of the focusing lens 236 is offset a first distance from the first optical axis 205. Derived by the brushless motor, the integral rotary structure 215 and the focusing lens 236 can make synchronous rotation. Thus the laser beam focused by the focusing lens 236 can spin along the annular radiation position 202, and bombard the droplets one by one that reaches the annular radiation position 202.

When the focusing lens 236 and condenser mirror 214 are fixedly connected, the optical axis of the focusing lens 236 is parallel to the first optical axis 205.

The laser device 204 can be a pulses pump laser device having a high pulse frequency. Thus the laser beam generated by the laser device 204 can bombard a large number of droplets per unit time. The pulses pump laser may be a Q-switched laser device or a mode-locked laser device.

The laser pulses emitted from the laser device 204 is synchronized with the droplet ejection of the droplet nozzle array 201 and the rotation of the condenser mirror 214. Thus when a droplet 22 reaches the annular radiation position 202, a corresponding pulse of the laser beam 31 can bombard the droplet 22, and meanwhile the condenser mirror 214 can collect and reflect the extreme ultraviolet light radiated from the bombarded droplet 22 and converge the extreme ultraviolet light at the central focus 220.

In a particular embodiment, the laser device 204 is a $CO_2$ laser device. An output power of the laser device 204 can between 10 KW and 1000 KW.

In some embodiments, since the multiple nozzles 21 of the droplet nozzle array 201 can sequentially and continuously eject droplets 22 to the annular radiation position 202, and since the brushless motor can drive the focusing lens 236 and the condenser mirror 214 to rotate, the laser beam 31 focused by the focusing lens 236 can spin a circle and sequentially bombard the droplets one by one that reaches the annular radiation position 202. For example, the laser beam 31 can sequentially bombard the first droplet ejected from the first nozzle 21a1, the second droplet ejected from the second nozzle 21a2, the third droplet ejected from the third nozzle 21a3, . . . , and the Nth droplet ejected from the Nth nozzle 21an. Then the brushless motor can drive the focusing lens 236 and the condenser mirror 214 to continuously rotate. Thus the laser beam 31 focused by the focusing lens 236 can spin another circle and sequentially bombard the droplets one by one that reaches the annular radiation position 202.

In some embodiments, a rotating direction of the focusing lens 236 can be a clockwise direction. In some other embodiments, a rotating direction of the focusing lens 236 can be a counterclockwise direction.

In some embodiments, the EUV light source further comprises a control unit (not shown in the figures). The control unit is configured for synchronously outputting a first control signal sequence and a second control signal sequence. The first control signal sequence is for controlling the multiple nozzles 21 to eject droplets 22 sequentially. The second control signal sequence is for controlling the brushless motor to drive the focusing lens 236 and the condenser mirror 214 rotating synchronously.

In some embodiments, the first control signal sequence and the second control signal sequence are synchronized with a pulse signal sequence that drives the laser dives 204 to generate the pulsed laser beam 31.

In some embodiments, the EUV light source further includes a cleaning system configured to clean the contaminants on the elliptical reflective surface 231 of the condenser mirror 214. For example, some splashing dust generated from the bombarded droplets can be cleaned by the cleaning system.

Figure 10:
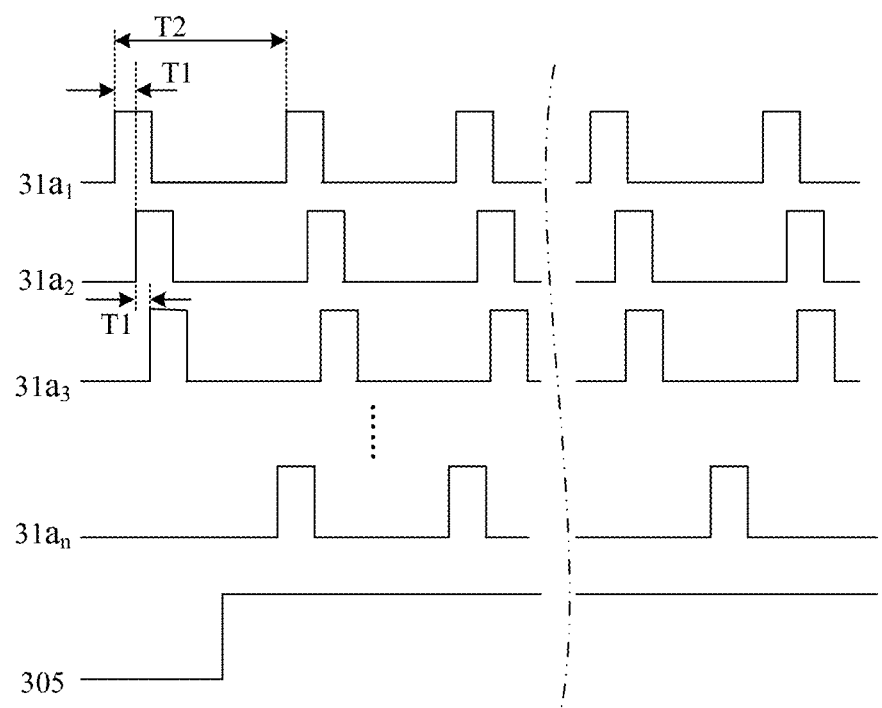
FIG. 10 is a control signal diagram of an exemplary EUV light source in accordance with some embodiments of the disclosed subject matter.

Referring to FIG. 10, a control signal diagram of an exemplary EUV light source is shown in accordance with some embodiments of the disclosed subject matter. As illustrated, the control signal generated from the control unit can include the first control 31 and the second control signal 305. The first control signal can include signal sequence 31a1, signal sequence 31a2, signal sequence 31a3, . . . , and signal sequence 31an.

The first signal and the second signal 305 are generated based on a same clock signal. The number of the first signal is equal to the number of the nozzles 21. The signal sequence 31a1, signal sequence 31a2, signal sequence 31a3, . . . , and signal sequence 31an respectively control a switch corresponding to the first nozzle 21a1, the second nozzle 21a2, the third nozzle 21a3, . . . , and the Nth nozzle 21an respectively, which are in connection with FIG. 9 described above. The second signal 305 controls the brushless motor to drive the condenser lens 214 and the focusing lens 236 to rotate, which is in connection with FIG. 2 described above.

As illustrated in FIG. 10, the signal sequence 31a1, signal sequence 31a2, signal sequence 31a3, . . . , and signal sequence 31an comprise pulses signals. A time interval between two adjacent pulses is a second lag period T2. A time lag between the signal sequence 31a2 and the signal sequence 31a1 is a first lag period T1. A time lag between the signal sequence 31a3 and the signal sequence 31a2 is a first lag period T1. Similarly, a time lag between the signal sequence 31an and the prior signal sequence 31a(n−1) is a first lag period T1. A time interval between two adjacent pulses of each signal sequence is a second lag period T2.

In some embodiments, a quantitative relationship between the first lag period T1 and the second lag period time is NT1=T2. N is a total number of the first signal, N is also a total number of the multiple nozzles 21. Thus the multiple nozzles 21 of the droplet nozzle array 201 can sequentially and cyclically eject droplets 22 to the annular radiation position 202, the laser beam 31 focused by the focusing lens 236 can cyclically spin and sequentially bombard the droplets one by one that reaches the annular radiation position 202, and the elliptical reflective surface 231 of the condenser mirror 214 can cyclically rotate, collect and reflect the radiated extreme ultraviolet light, and converge the extreme ultraviolet light at the central focus 220.

The first signal including signal sequence 31a1, signal sequence 31a2, signal sequence 31a3, . . . , and signal sequence 31an can be applied to the switches of the multiple nozzles 21 of the droplet nozzle array 201. Under the control of the first signal, the droplet nozzle array 201 can eject droplets 22 downwardly to the annular radiation position 202 by the following process. In a first circulation, the first nozzle 21a1 ejects a first droplet at a first instance, the second nozzle 21a2 ejects a second droplet at a second instance, the third nozzle 21a3 ejects a third droplet at a third instance, . . . , the Nth (N≥3) nozzle 21an eject an Nth droplet at an Nth instance. The time intervals between all adjacent time instances are the first lag period T1. And then in a second circulation, the multiple nozzles 21 can repeat the above process. The time interval between two adjacent circulations is the second lag period T2.

When the first signal is applied to the droplet nozzle array 201, the second signal 305 is also applied to the brushless motor.

Before the droplet nozzle array 201 ejecting droplets, the condenser mirror 214 and the focusing lens 236 are in a first initial position. When the EUV light source starts to work, the condenser mirror 214 and the focusing lens 236 accelerate and move from the first initial position to a second initial position, and then the condenser mirror 214 and the focusing lens 236 make a uniform rotational motion from the second initial position. When the focusing lens 236 is located in the second initial position, the laser beam 31 focused by the focusing lens 236 can bombard the first droplet ejected from the first nozzle 21a at the annular radiation position 202. In the same time, the condenser mirror 214 can collect and reflect the generated extreme ultraviolet light radiated from the bombarded first droplet, and converge the extreme ultraviolet light at the central focus 220.

In some embodiments, a rising edge of the second signal 305 lags behind the first pulse of the signal sequence 31a1. A lag period from the second signal 305 to the first pulse of the signal sequence 31a1 is a time range for the first droplet moving from the first nozzle 21a to the annular radiation position 202.

In some embodiments, a working process of the EUV light source can include the following steps. The droplet nozzle array 201 receives the first signal, and the brushless motor receives the second signal sequence 305. The first signal can control the multiple nozzles 21 sequentially and continuously eject droplets 22 to the annular radiation position 202. When the first droplet reaches the annular radiation position 202, the focusing lens 236 and the condenser mirror 214 rotate to the second initial position. The laser beam 31 focused by the focusing lens 236 can bombard the first droplet at the annular radiation position 202. In the meanwhile the condenser mirror 214 can collect and reflect the EUV light radiated from the bombarded first droplet, and converge the EUV light at the central focus 220. Next, the second signal 305 can control the brushless motor to drive the focusing lens 236 and the condenser mirror 214 rotating at a constant speed. Thus the laser beam 31 focused by the focusing lens 236 also spins and sequentially bombards the droplets one by one that reaches the annular radiation position 202. And the condenser mirror 214 can collect and reflect the EUV light radiated from the bombarded droplets one by one, and converge the EUV light at the central focus 220.

The condenser mirror 214 can rotate at a constant speed. An angular velocity of the condenser mirror 214 is equal to a rotational angle of the condenser mirror 214 to collect the EUV light radiated from two adjacent bombarded droplets divided by the first lag period T1.

In some embodiments of the disclosed subject matter, an exposure apparatus is provided. The exposure apparatus includes an EUV light source described above. The disclosed EUV light source can be used as an exposure light source of the exposure apparatus. A specific structure of the exposure apparatus can be referred to some existing structures of the exposure apparatus.

Referring to FIGS. 11-17, schematic structures of an exemplary integrated rotary structure corresponding to certain stages of a fabricating process are shown in consistent with some embodiments of the disclosed subject matter.

Figure 11:
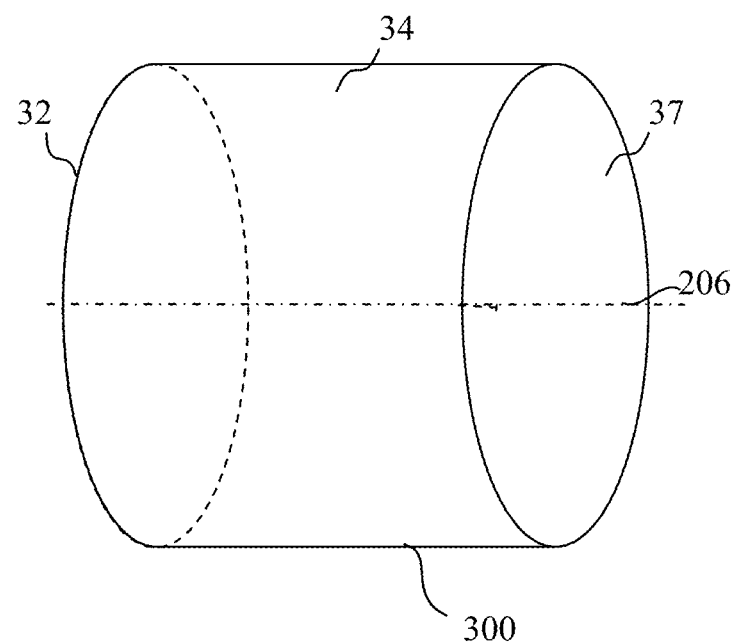
FIGS. 11-17 illustrate schematic structures of an exemplary integrated rotary structure corresponding to certain stages of a fabricating process consistent with some embodiments of the disclosed subject matter.

Referring to FIG. 11, a cylinder material 300 can be provided. The cylinder material 300 comprises a circular side wall 34, and two flat surfaces including a third surface 37 and a forth surface 32. An axis 206 of the cylinder material 300 goes through the centers of the third surface 37 and the forth surface 32.

The cylinder material 300 has a cylindrical shape. A material of the cylinder material 300 can be metal, quartz, or any other suitable material.

Figure 12:
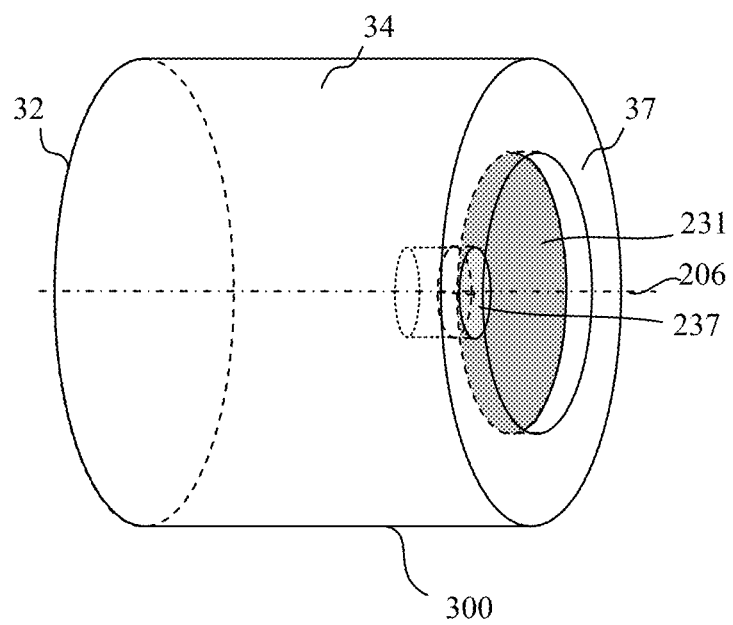

Referring to FIG. 12, the third surface 37 of the cylinder material 300 can be machined. An elliptical reflective surface 231 can be formed in the cylinder material 300. The second optical axis of the elliptical reflective surface 231 coincides with the axis 206 of the cylinder material 300.

The ellipsoidal reflective surface 231 sinks into the cylinder material 300 and has a first depth, which means that an edge of the elliptical reflective surface 231 has a second distance far from the third surface 37. The second distance ensures an enough space for subsequent forming process of the non-reflective surface, and can avoid a potential damage to the elliptical reflective surface 231 during the subsequent forming process of the non-reflective surface.

A first through hole 237 can be formed in the cylinder material 300. The first through hole 238 goes through the center of the elliptical reflective surface 231. A size of the first through hole 237 is smaller than the size of the elliptical reflective surface 231. An axis of the first through hole 237 coincides with the second optical axis 206.

Figure 13:
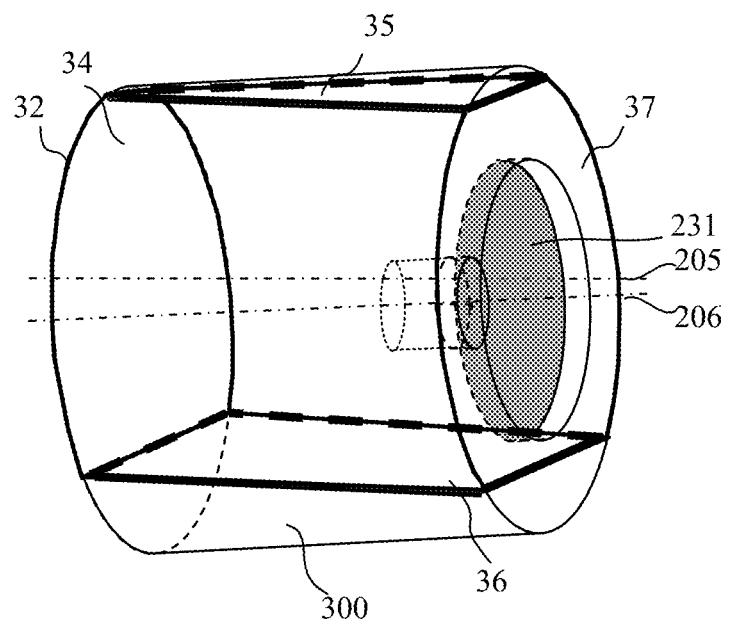
Figure 14:
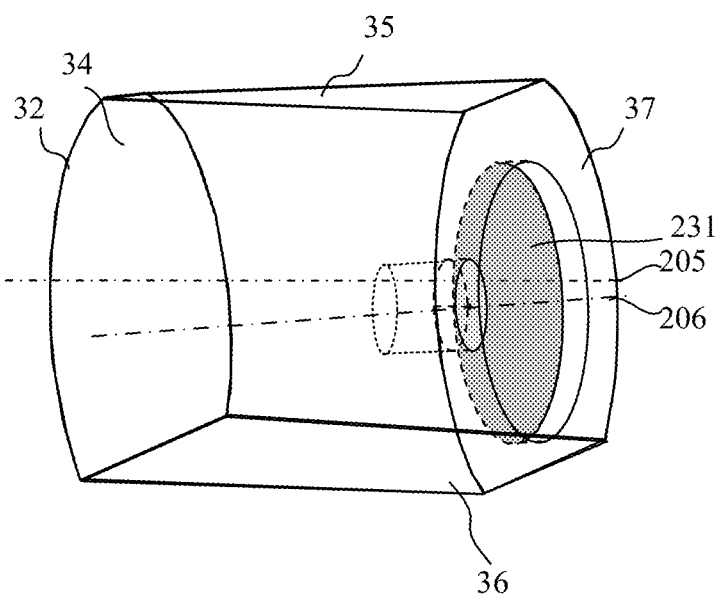

Referring to FIG. 13 and FIG. 14, the circular side wall 34 of the cylinder material 300 can be machined to form a fifth surface 35 and a sixth surface 36. There is a first angle between the fifth surface 35 and the sixth surface 36. A central symmetric axis of the fifth surface 35 and the sixth surface 36 is the first optical axis 205.

Referring to FIG. 13, the two regions in the thick solid line 35 are to be formed as the fifth surface 35 and the sixth surface 36. The fifth surface 35 and the sixth surface 36 are used for holding planes in the subsequent processes. The fifth surface 35 and the sixth surface 36 are parallel to each other. Both the fifth surface 35 and the sixth surface 36 have a first angle with the extension line of the second optical axis 206. In another word, the center of the elliptical reflective surface 231 is offset with respect to the first optical axis 205. Additionally, a distance between the second optical axis 206 and an overlap line of the fifth surface 35 and the third surface 37 is greater than a distance between the second optical axis 206 and an overlap line of the sixth surface 36 and the third surface 37.

Figure 15:
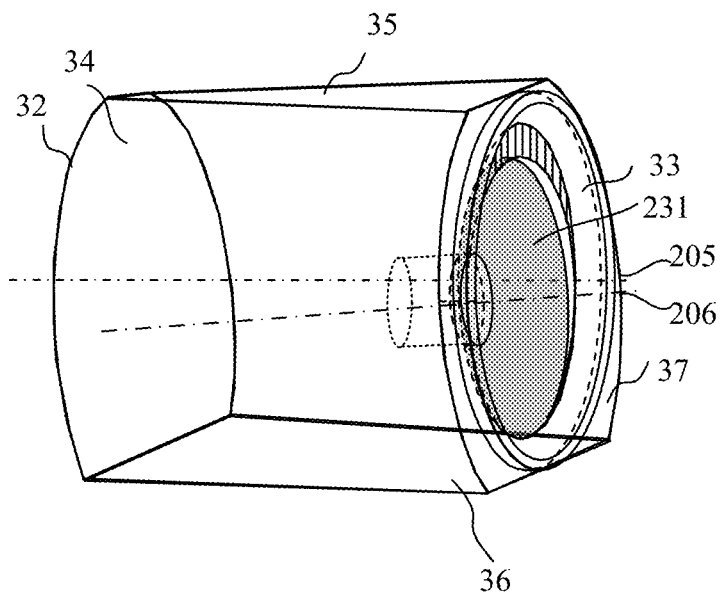
Figure 16:
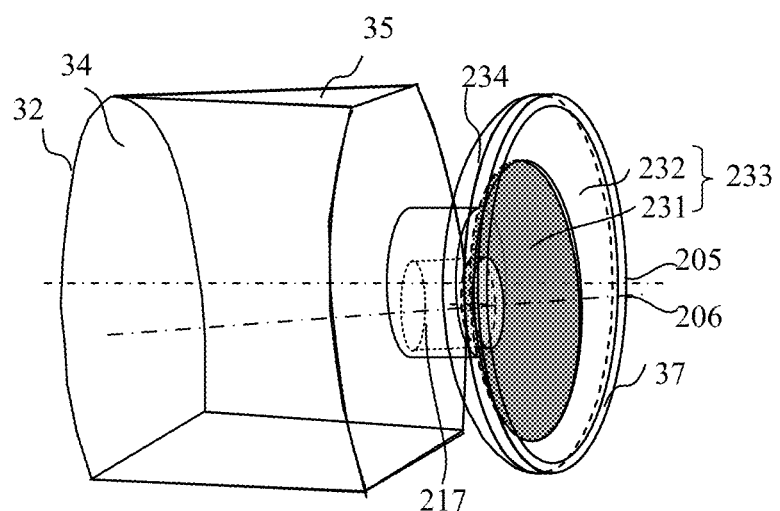

Referring to FIG. 15 and FIG. 16, using the fifth surface 35 and the sixth surface 36 as holding planes, the third surface 37 of the cylinder material 300 can be machined to form a non-reflective surface 232. The non-reflective surface 232 has a curved shape, and is in contact with the edge of the elliptical reflective surface 231. The elliptical reflective surface 231 and the non-reflective surface 232 constitute the first surface 233 of the condenser mirror 214.

When the fifth surface 35 and the sixth surface 36 are used as holding planes, the elliptical reflective surface 231 is eccentric and inclined relating to the first optical axis 205. An inclined angle of the elliptical reflective surface 231 is equal to an angle between the first optical axis 205 and the second optical axis 206. With respect to the third surface 37, the edge of the elliptical spherical reflective surface 231 has a high point and a low point. The low point is a point of the edge of the elliptical reflective surface 231 that is nearest to the third surface 37, and the high point is a point of the edge of the elliptical reflective surface 231 that is farthest to the third surface 37.

In some embodiments, there are two steps for forming the non-reflective surface 231. The first step is forming a first cambered surface 33 that is in contact with or close to the high point of the elliptical spherical reflective surface 231. The second step is forming a second cambered surface that is in contact with or close to the low point of the elliptical spherical reflective surface 231. The second cambered surface can be machined in the shaded region as illustrated in FIG. 15.

In some embodiments, after forming the non-reflective surface 232, a roughening treatment can be performed on the non-reflective surface 232. An increasing of the roughness of the non-reflecting surface 232 can reduce a reflection rate of the EUV radiation. The roughening treatment can be a grinding process or a spraying process. Prior to performing the roughening treatment, a protective film can be formed on the elliptical reflective surface 231.

In some embodiments, after forming the non-reflective surface 232, a portion of the cylinder material 300 can be removed along the fifth surface 35 and the sixth surface 36. Thus a second surface 234 can be formed opposite to the first surface 233. The second surface 234 can have a curved shape.

Next, the remaining portion of the cylinder material 300 can be machined along the fifth surface 35 and the sixth surface 36 to form a motor driving shaft 217 connecting with the second surface 324.

Figure 17:
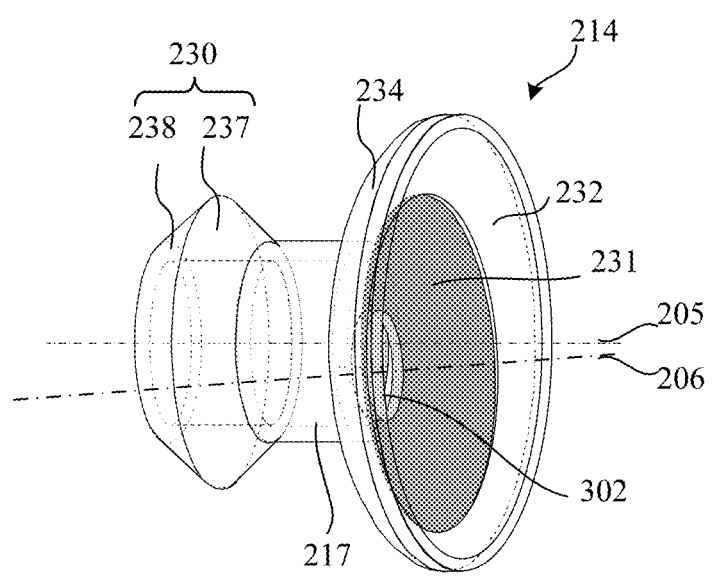

Referring to FIG. 17, the remaining portion of the cylinder material 300 can be machined along the fourth surface 34, the fifth surface 35, and the sixth surface 36 to form a thrust bearing 230 connecting with the motor driving shaft 217.

In some embodiments, the thrust bearing 230 are two inner rings connected with the motor driving shaft 217. The two inner rings include a first inner ring 235, and a second inner 238 integrally connected with the first inner ring 235. The second inner ring 238 is located above the first inner ring 235.

A portion of the first inner ring 235 and a portion of the second inner ring 238 are protruded from the outer surface of the motor driving shaft 217. The outer surfaces of the first inner ring 235 and the second inner ring 238 are inclined to the first axis 205. An angle between the outer surface of the first inner ring 235 and the outer surface of the second inner ring 238 is less than 90 degrees. In one embodiment, a cross-sectional view of the outer surface of the first inner ring 235 and the outer surface of the second inner ring 238 is "< >" shape.

In some embodiments, the inner rings of the thrust bearing 230 and the motor driving shaft 217 can be further machined. A second through hole can be formed in the motor driving shaft 217. A third through hole can be formed in the thrust bearing 230. The third through hole is connected with the second through, and the second through hole is connected with the first through hole.

It should be noted that, the disclosed method for fabricating the integrated rotary structure 215 can be performed by any suitable equipment including computer numerical control (CNC) machine tools.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, an extreme ultraviolet lithography (EUV) light source, an exposure apparatus, and a method for fabricating an integrated rotary structure are provided.

Although the disclosed subject matter has been described and illustrated in the foregoing illustrative embodiments, it is understood that one disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of one disclosure.

What is claimed is:

1. A method for fabricating an integrated rotary structure, comprising:
   providing a cylinder material, comprising a circular side wall, a third surface at one end of the circular side wall and a fourth surface at another end of the circular side wall opposing to the third surface;
   machining the third surface of the cylinder material to form an elliptical reflective surface, wherein:
      a second optical axis coincides with an axis of the elliptical reflective surface and an axis of the cylinder material passing through centers of the third and fourth surfaces, and
      the ellipsoidal reflective surface sinks into the cylinder material by a first depth;
   forming a first through hole going through a center of the elliptical reflective surface;
   machining the circular side wall of the cylinder material to form a fifth surface and a sixth surface, wherein:
      both the fifth surface and the sixth surface have a first angle with the second optical axis, and
      a central symmetrical axis of the fifth surface and the sixth surface coincides with a first optical axis; and
   using the fifth surface and the sixth surface as holding planes, machining the third surface to form a curved non-reflective surface surrounding the elliptical reflective surface.

2. The method of claim 1, wherein forming the curved non-reflective surface comprises:
   forming a first cambered surface that is in contact with or close to a high point of the elliptical reflective surface; and
   forming a second cambered surface that is in contact with or close to a low point of the elliptical reflective surface.

3. The method of claim 1, further comprising:
   removing a portion of the cylinder material along the fifth surface and the sixth surface to form a curved second surface, wherein the second surface opposites a first surface comprising the non-reflective surface and the elliptical reflective surface;
   machining a remaining portion of the cylinder material along the fifth surface and the sixth surface to form a motor driving shaft connecting with the second surface; and machining a remaining portion of the cylinder material along the fourth surface, the fifth surface, and the sixth surface to form a thrust bearing connecting with the motor driving shaft.

4. The method of claim 3, wherein the integrated rotary structure includes:
   a condenser mirror comprising a first surface and a second surface opposing to the first surface, and
   a motor driving shaft that is integrally connected with the condenser mirror.

5. The method of claim 3, wherein:
   a second through hole is in the motor driving shaft; and
   the first through hole and the second through hole are interconnected with each other to form a laser beam incident channel.

6. The method of claim 1, wherein:
   a first surface faces a droplet nozzle array,
   a second surface is connected with a motor driving shaft,
   the first surface comprises an eccentric and inclined elliptical reflective surface and a non-reflective surface surrounding the elliptical reflective surface, and
   the elliptical reflective surface is configured for collecting and reflecting extreme ultraviolet light, and converging the extreme ultraviolet light at a central focus under an annular radiation position.

7. The method of claim 6, wherein the integrated rotary structure further comprises a thrust bearing integrally connected with a motor driving shaft.

8. The method of claim 1, wherein the integrated rotary structure rotates with respect of the first optical axis.

9. The method of claim 1, wherein:
   the second optical axis goes through a central focus; and
   an inclined angle of the elliptical reflective surface is equal to an angle between the first optical axis and the second optical axis.

* * * * *